United States Patent
Weber et al.

(10) Patent No.: US 6,305,353 B1
(45) Date of Patent: *Oct. 23, 2001

(54) ELECTRONIC ENGINE SPEED AND POSITION APPARATUS FOR CAMSHAFT GEAR APPLICATIONS

(75) Inventors: Gregory A. Weber, Greensburg, IN (US); G. Steven Antcliff, Hambleden Oxon; John Jerl Purcell, III, Marlow, both of (GB)

(73) Assignee: Cummins Engine Company, Columbus, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/641,788

(22) Filed: Aug. 18, 2000

Related U.S. Application Data

(63) Continuation of application No. 09/032,154, filed on Feb. 27, 1998, now Pat. No. 6,131,547.

(51) Int. Cl.⁷ ........................................................ F02P 5/00
(52) U.S. Cl. ..................... 123/406.58; 123/476; 73/117.3
(58) Field of Search .............................. 123/406.58, 476, 123/477, 612; 73/117.3, 116

(56) References Cited

U.S. PATENT DOCUMENTS

| | | | |
|---|---|---|---|
| 3,626,224 | 12/1971 | Vigneault et al. | 310/168 |
| 4,002,937 | 1/1977 | Anson | 310/168 |
| 4,155,340 | 5/1979 | Fernquist et al. | 123/148 CC |
| 4,235,101 | 11/1980 | Stadelmann | 73/116 |
| 4,356,447 | 10/1982 | Honig et al. | 324/169 |
| 4,365,602 | 12/1982 | Stiller et al. | 123/414 |
| 4,442,822 | 4/1984 | Kondo et al. | 123/643 |
| 4,558,591 | 12/1985 | Francis et al. | 73/116 |
| 4,715,009 | 12/1987 | Böhmler et al. | 364/565 |
| 4,760,827 | 8/1988 | Schreiber et al. | 123/414 |
| 4,766,865 | 8/1988 | Hartel | 123/414 |
| 4,779,454 | 10/1988 | Fitzner et al. | 73/116 |
| 4,833,405 | 5/1989 | Richards et al. | 324/208 |
| 4,932,388 | 6/1990 | Chiba et al. | 123/613 |
| 4,936,277 | 6/1990 | Deutsch et al. | 123/436 |
| 4,942,761 | 7/1990 | Batzill | 73/119 R |
| 4,972,332 | 11/1990 | Luebbering et al. | 364/565 |
| 4,989,574 | 2/1991 | Abe | 123/617 |
| 5,070,727 | 12/1991 | Davis et al. | 73/116 |
| 5,109,695 | 5/1992 | James et al. | 73/117.3 |
| 5,119,670 | 6/1992 | Whitehorn et al. | 73/116 |
| 5,144,233 | 9/1992 | Christenson et al. | 324/207.25 |
| 5,165,271 | 11/1992 | Stepper et al. | 73/116 |
| 5,166,611 | 11/1992 | Kujawa, Jr. et al. | 324/166 |
| 5,227,719 | 7/1993 | Peterson et al. | 324/174 |
| 5,243,279 | 9/1993 | Bajat et al. | 324/207.21 |
| 5,293,776 | 3/1994 | Takegami et al. | 73/119 R |
| 5,331,154 | 7/1994 | Kondo et al. | 250/231.17 |
| 5,347,857 | 9/1994 | Mirhakimi et al. | 73/118.1 |
| 5,361,630 | 11/1994 | Kowalski | 73/177.3 |
| 5,428,992 | 7/1995 | Wolfe et al. | 73/116 |

(List continued on next page.)

FOREIGN PATENT DOCUMENTS

| | | |
|---|---|---|
| 2604599 A1 | 8/1977 | (DE) . |
| 3702474 | 8/1987 | (DE) . |
| 4309245 A1 | 9/1994 | (DE) . |
| 0 569 613 A1 | 11/1993 | (EP) . |
| 0 665 375 A2 | 2/1995 | (EP) . |
| 2 272 973 A | 6/1994 | (GB) . |

*Primary Examiner*—John Kwon
(74) *Attorney, Agent, or Firm*—Woodard, Emhardt, Naughton, Moriarty & McNett

(57) ABSTRACT

An apparatus for sensing engine speed and engine angular position. A tone wheel with a plurality of reference indicators and a position indicator is mounted to a camshaft gear. The reference and position indicators rotate past a Hall Effect sensor which generates a sensor signal suitable for use by a controller for determination of engine speed and engine angular position. Other embodiments do not include a controller.

26 Claims, 9 Drawing Sheets

U.S. PATENT DOCUMENTS

| | | | |
|---|---|---|---|
| 5,444,369 | 8/1995 | Luetzow | 324/207.2 |
| 5,460,134 | 10/1995 | Ott et al. | 123/476 |
| 5,469,055 | 11/1995 | Mueller et al. | 324/207.21 |
| 5,469,823 | 11/1995 | Ott et al. | 123/414 |
| 5,476,082 | 12/1995 | Carpenter et al. | 123/478 |
| 5,520,043 | 5/1996 | Koelle et al. | 73/117.3 |
| 5,541,506 | 7/1996 | Kawakita et al. | 324/207.2 |
| 5,548,995 | 8/1996 | Clinton et al. | 73/116 |
| 5,555,776 | 9/1996 | Gazza | 74/567 |
| 5,560,462 | 10/1996 | Gustin | 192/58.42 |
| 5,583,431 | 12/1996 | Ouchi et al. | 324/174 |
| 5,614,821 | 3/1997 | Leiderer | 324/174 |
| 5,614,822 | 3/1997 | Sakamoto et al. | 324/174 |
| 5,621,644 | 4/1997 | Carson et al. | 364/431.04 |
| 5,647,322 | 7/1997 | Fukui et al. | 123/414 |
| 5,671,714 | 9/1997 | Fukui et al. | 123/414 |
| 5,789,658 | 8/1998 | Henn et al. | 73/1.37 |
| 5,821,411 | 10/1998 | Lohmann et al. | 73/116 |
| 5,823,166 | 10/1998 | Etenmann et al. | 123/414 |
| 5,856,922 | 1/1999 | Jehanno | 364/431.061 |
| 5,881,696 | 3/1999 | Wada | 123/406.62 |
| 5,965,806 | 10/1999 | Antcliff et al. | 73/116 |
| 6,016,789 | 1/2000 | Denz et al. | 123/406.62 |
| 6,035,826 | 3/2000 | Matsuoka | 123/406.62 |

ELECTRONIC ENGINE SPEED AND POSITION APPARATUS FOR CAMSHAFT GEAR APPLICATIONS

This application is a continuation of and claims priority to U.S. patent application Ser. No. 09/032,154, filed Feb. 27, 1998, which is incorporated herein by reference, which issued as U.S. Pat. No. 6,131,547 on Oct. 17, 2000.

BACKGROUND OF THE INVENTION

The present invention relates to systems to detect rotational characteristics of a mechanical member, and more particularly, but not exclusively, relates to a sensor arrangement to detect a rotational characteristic of an engine crankshaft or camshaft.

With the advent of electronically controlled internal combustion engines, devices to detect rotation of the engine crankshaft or camshaft have become increasingly popular. For example, angular position of the crankshaft or "crank angle" is frequently sensed to control engine fueling, ignition, and exhaustion. Also, engine speed, as indicated by rotational speed of the crankshaft, is often an important parameter in various engine control system schemes. U.S. Pat. Nos. 5,476,082 to Carpenter et al., 5,361,630 to Kowalski, and 4,936,277 to Deutsch et al. are cited as general sources of background information relating to various electronic engine control systems which rely on measurement of crankshaft rotation.

In order to meet increasingly rigorous emission standards imposed on vehicles with internal combustion engines, crank angle needs to be measured with high precision. One way to provide the needed precision is to employ a crank angle detection system that has a sensor and a reference member which rotates with the crankshaft adjacent the sensor. The sensor is configured to detect rotation of the reference member.

One type of detection system has a reference member with several angularly spaced indicators, or "angle marks," along its periphery which are configured to alter a magnetic field. As each one of these indicators moves past the sensor, the sensor detects the corresponding alteration of the magnetic field and generates a detection pulse. By varying the spacing of the indicators in a known manner, an index to the relative angular position of the crankshaft may be provided. Also, the rate of these pulses may be used to determine rotational speed of the crankshaft. U.S. Pat. Nos. 5,520,043 to Koelle et al., 5,469,823 to Ott et al., 5,460,134 to Ott et al., 4,760,827 to Schreiber et al., 4,442,822 to Kondo et al., and 4,365,602 to Stiller et al. are cited as examples of various types of crank angle detection systems.

In one crank angle detection system arrangement, a reference disc is attached to a transmission fly wheel external to the engine. Unfortunately, external placement of the disc usually requires a separate design effort for each different type of transmission offered with a given engine design. Therefore, in many instances it is desirable to provide the reference disc as part of the engine. However, attaching the disc directly to the crankshaft generally requires lengthening the crankshaft to provide an appropriate attachment site.

U.S. Pat. No. 5,361,630 to Kowalski discloses one attempt to solve this problem by integrally forming indicator slots on a crankshaft counter weight which then serves as a rotational reference member. Unfortunately, this approach still requires an extensive re-design of the crankshaft. Also, the integral counter weight design requires disassembly of the crankshaft should replacement or adjustment of the reference member be required.

Thus, there remains a need for a crankshaft rotation detection system that can be readily adapted to different engine configurations. The present invention satisfies this need.

SUMMARY OF THE INVENTION

The present invention provides for an apparatus including an internal combustion engine with a camshaft gear, the camshaft gear being configured to rotate about a rotational axis during engine operation. A wheel is attached to the camshaft gear, including a plurality of reference indicators. The reference indicators are spaced apart from one another by a first angular width. The wheel includes a position indicator which is spaced apart from the reference indicators by a second angular width greater than the first angular width. The apparatus also includes a sensor mounted to the engine whereby the wheel rotates proximate to the sensor.

It is an object of the present invention to provide an improved apparatus for measuring the rotational speed and angular position of an internal combustion engine.

These and other objects of the invention will be apparent from the description of the preferred embodiment, the description of the drawings, the drawings, and the claims to follow.

DESCRIPTION OF THE PREFERRED EMBODIMENT

Figure 1:
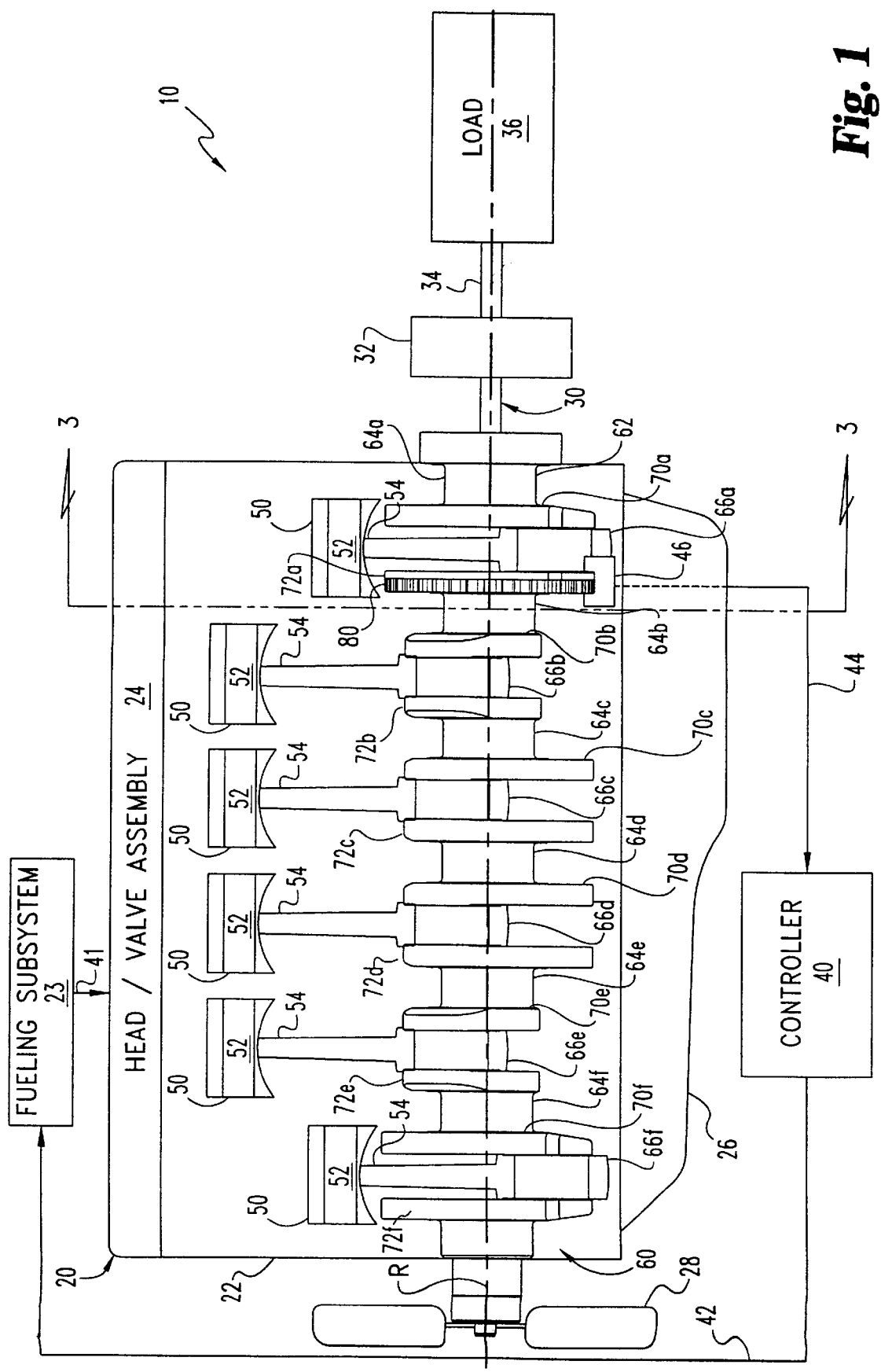
FIG. 1 is a partial diagrammatic view of an internal combustion engine system of one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

FIG. 1 depicts internal combustion engine system 10 of the present invention. System 10 includes an engine 20 with block 22, a fueling subsystem 23, and head/valve assembly 24. Engine 20 also includes oil pan 26 and a cooling system represented by radiator fan 28. Preferably, engine 20 has six cylinders and is configured for 4 cycle operation; however, other internal combustion engine configurations known to those skilled in the art are also contemplated.

Engine 20 drives power train 30. Power Train 30 includes transmission 32 and drive shaft 34 which drives load 36. For an application that incorporates system 10 into a vehicle, load 36 may represent the powered axle(s) and corresponding ground engaging wheels of the vehicle.

System 10 also includes controller 40 which regulates various operations of engine 20. Controller 40 is operatively coupled to fueling subsystem 23 by line 42. Preferably, fueling subsystem 23 is an electronically controlled fuel pump mechanism which meters fuel supplied to the cylinders of engine 20 in a conventional manner. Line 41 represents the functional coupling of fueling subsystem 23 to engine 20. However, other fueling arrangements are also contemplated, including, but not limited to, an individually actuatable fuel injector for each cylinder. For this alternative embodiment, it is preferred that each injector be directly coupled to controller 40.

Controller 40 also includes an input line 44 from crankshaft sensor assembly 46. Among the operations regulated by controller 40 are engine ignition, fueling, and exhaustion. In part, these activities are controlled by providing appropriate activation signals to fueling subsystem 23. As such, line 42 represents one or more signal paths between controller 40 and fueling subsystem 23. Besides sensor assembly 46, it is envisioned that controller 40 receives input from other sensors including an engine throttle (not shown). The detailed interface and control system processes that may be performed by controller 40 are of the type known to those skilled in the art.

Controller 40 may be an electronic circuit comprised of one or more components. Similarly, controller 40 may be comprised of digital circuitry, analog circuitry, or both. Also, controller 40 may be programmable, an integrated state machine, or hybrid combination thereof. However, preferably controller 40 is a microprocessor based device of known construction.

Engine block 22 defines a number of cylinder bores (not shown) with corresponding combustion chambers each configured to receive a piston assembly 50 in a conventional manner. Each piston assembly 50 includes a piston 52 and pivotably attached connecting rod 54.

Engine 20 includes crankshaft 60 connected to each piston assembly 50. Crankshaft 60 includes main shaft 62 comprised of crankshaft bearing journals 64a–64f which form a rotational bearing relationship with engine block 22 in a conventional manner. Each connecting rod 54 of piston assemblies 50 is pivotally connected to crankshaft 60 by a corresponding connecting rod journal 66a–66f. Rod journal 66a is pivotally connected to crankshaft 60 at opposing ends by a pair of crankshaft webs 70a, 72a. Crankshaft web 70a pivotally connects to crankshaft bearing journal 64a, and crankshaft web 72a pivotally connects to crankshaft bearing journal 64b. The remaining rod journals 66b–66f and crankshaft webs 70b–70f, 72b–72f are similarly configured along crankshaft 60. Furthermore, crankshaft webs 70a–70f, 72a–72f are preferably configured as crankshaft counter weights. Crankshaft webs 70a–70f, 72a–72f and rod journals 66a–66f are configured to rotate relative to crankshaft bearing journals 64a–64f so that crankshaft 60 turns about rotational axis R in a conventional manner.

A tone wheel 80 is mounted to crankshaft web 72a proximate to sensor assembly 46. Preferably, tone wheel 80 and sensor assembly 46 are configured to provide a sensor signal via input line 44 to controller 40 that corresponds to angular position of crankshaft 60. Furthermore, controller 40 may be configured to derive rotational speed information from this signal. Preferably, this speed and position information is used by controller 40 to control engine operation in a manner known to those skilled in the art.

Figure 2:
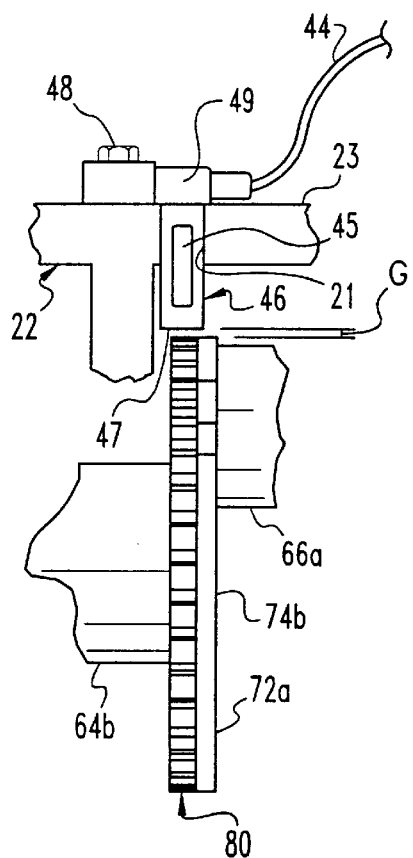
FIG. 2 is a partial bottom view of the tone wheel and crankshaft web assembly shown in FIG. 1.

Next, referring to FIG. 2, a partial bottom view of tone wheel 80 and crankshaft web 72a within engine 20 is shown. FIG. 2 depicts additional details concerning the relationship of tone wheel 80 and crankshaft web 72a to sensor assembly 46. Sensor assembly 46 extends through aperture 21 defined in wall 23 of block 22. Sensor assembly 46 has a detection end 47 positioned next to tone wheel 80 and separated therefrom by gap G. Sensor assembly 46 includes a hall effect device 45 postioned in detection end 47 to register changes in a magnetic field. Also shown is a mounting bolt 48 for mounting sensor assembly 46 to wall 23. Sensor assembly 46 has modular connector 49 configured for coupling to line 44. Tone wheel 80 rotates with crankshaft web 72a which is turn rotates as crankshaft 60 is turned. Preferably, gap G remains relatively constant during rotation of crankshaft 60.

Figure 3:
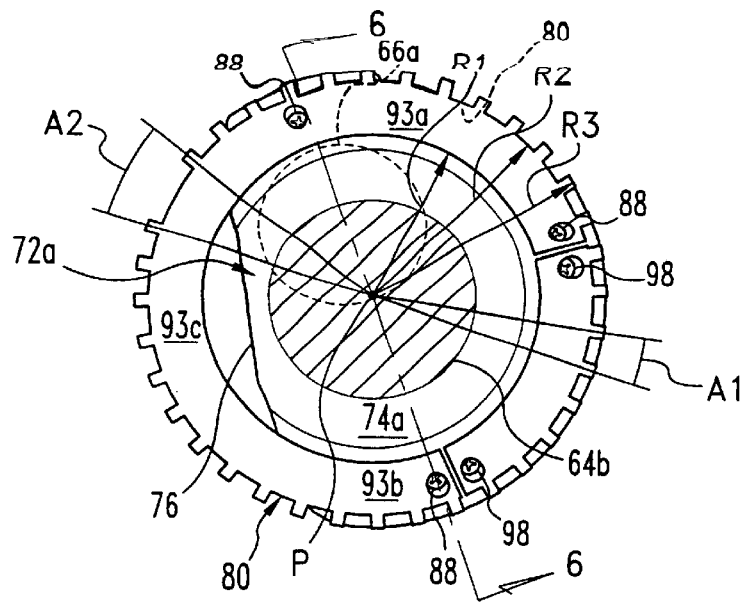
FIG. 3 is a front, partial cross-sectional view of the crankshaft showing the tone wheel and crankshaft web assembly of FIG. 1.
Figure 4:
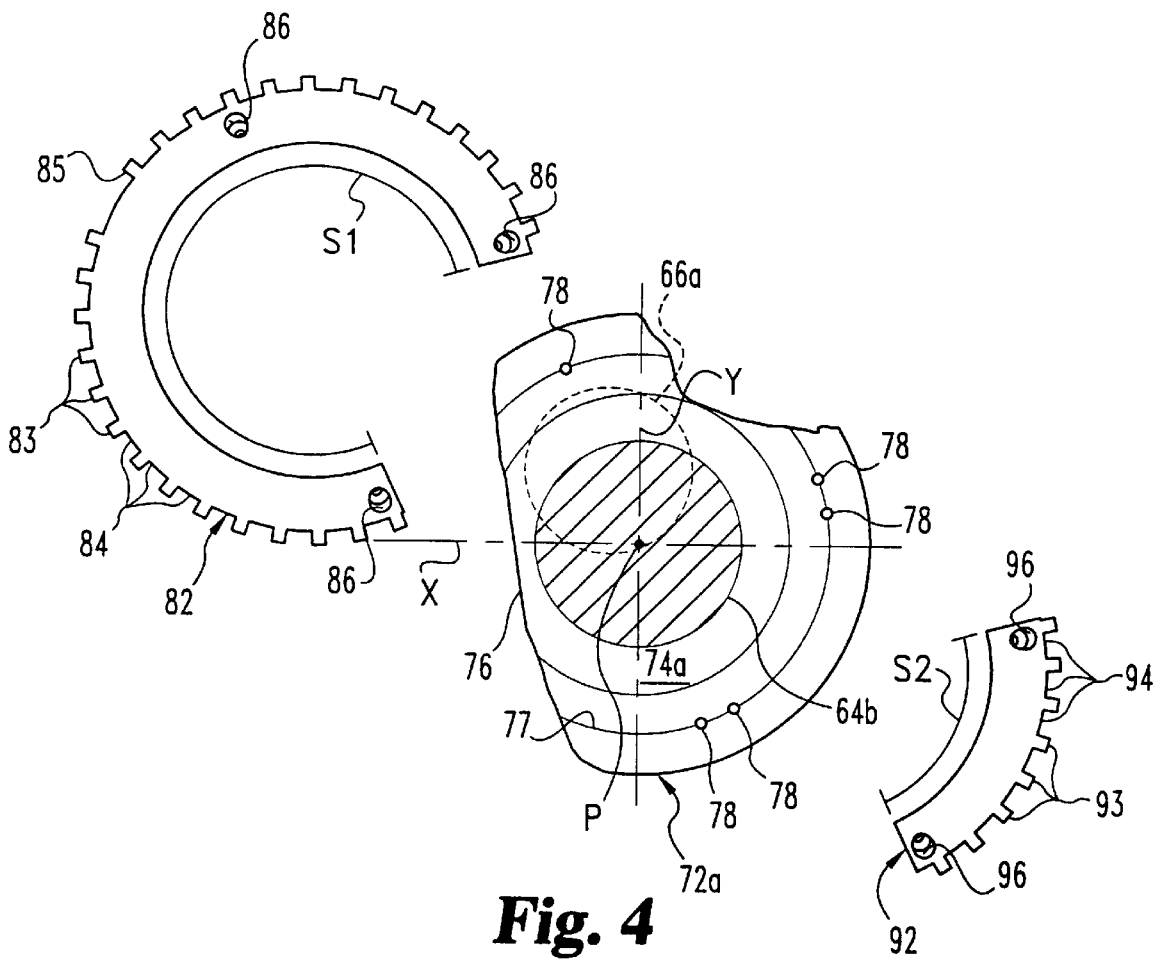
FIG. 4 is an exploded view of the assembly shown in FIG. 3 with the tone wheel fasteners removed for clarity.

Additionally referring to FIGS. 3–6, further details concerning the configuration of tone wheel 80 and crankshaft web 72a are provided. Tone wheel 80 is generally formed in a circular ring shape with an inner radius R1 as depicted in FIG. 3. Tone wheel 80 includes a first arcuate ring segment 82 and a second arcuate ring segment 92. Each arcuate segment 82, 92 defines a corresponding number of peripheral teeth 83, 93 angularly spaced apart from one another to define generally uniform gaps 84, 94 therebetween. Each of teeth 83, 93 have about the same general size and shape. Similarly, each gap 84, 94 has about the same size and orientation. As a result, each tooth of wheel 80 is angularly spaced apart from an adjacent tooth by separation angle A1 as represented in FIG. 3. Also, the minimum outer radius of wheel 80 corresponding to gaps 84, 94 of wheel 80 is indicated by radius R2, and a maximum outer radius of wheel 80 corresponding to teeth 83, 93 is indicated by radius R3. Segment 82 further defines an index gap 85 corresponding to index angle A2 as indicated in FIG. 3.

Figure 5:
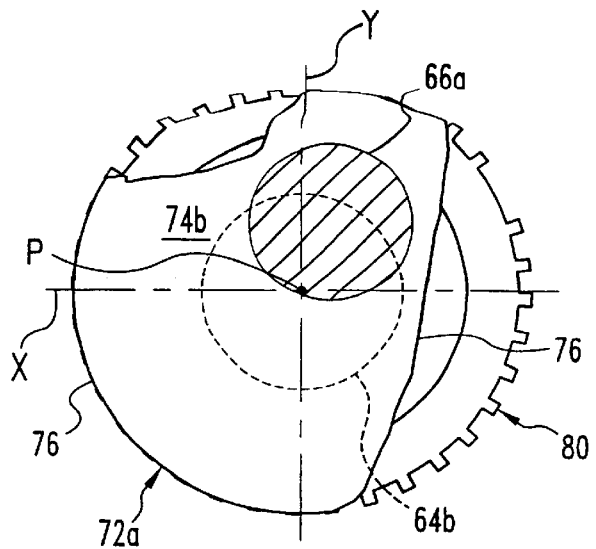
FIG. 5 is a rear, partial cross-sectional view of the crankshaft showing the tone wheel and crankshaft web assembly of FIG. 1.

Crankshaft web 72a includes face 74a defined by perimeter 76. Face 74a defines a recess 77 configured to receive wheel 80 and a number of threaded mounting bores 78 for mounting wheel 80 thereto. Because rotational axis R is perpendicular to the view plane of FIGS. 3–5, rotational axis R is represented by pivot point P in these figures. Perpendicular axes X, Y intersect at point P and radiate therefrom. Notably, face 74a is asymmetric with respect to pivot point P, axis R, axis X, and axis Y. Web 72a also has face 74b. Face 74b is located on a side of web 72a which is opposite the side having face 74a. Face 74b is illustrated in FIGS. 2 and 5, and is likewise asymmetric.

Segment 82 defines mounting holes 86. Similarly, segment 92 defines mounting holes 96. Mounting holes 86, 96 of wheel 80 are configured to align with corresponding threaded bores 78 of crankshaft web 72a. Once aligned, screws 88, 98 are threaded through holes 86, 96 to threadingly engage bores 78 and mount wheel 80 to crankshaft web 72a as illustrated in FIG. 3. Once mounted, wheel 80 has a generally circular ring shape which follows a generally circular path about crankshaft 60. Segment 82 includes end portion 93a mounted to crankshaft web 72a, end portion 93b mounted to crankshaft web 72a, and an intermediate arcuate portion 93c positioned between end portions 93a and 93b. Portion 93c extends past perimeter 76 of counter weight 72a. The multi-piece structure of wheel 80 permits segments 82, 92 to encircle a portion of crankshaft 60 without needing to disassemble crankshaft 60 or pass a reference member over an end of the crankshaft for installation or removal. By encircling the crankshaft, a high resolution index to crankshaft position ray be more readily provided.

Figure 6:
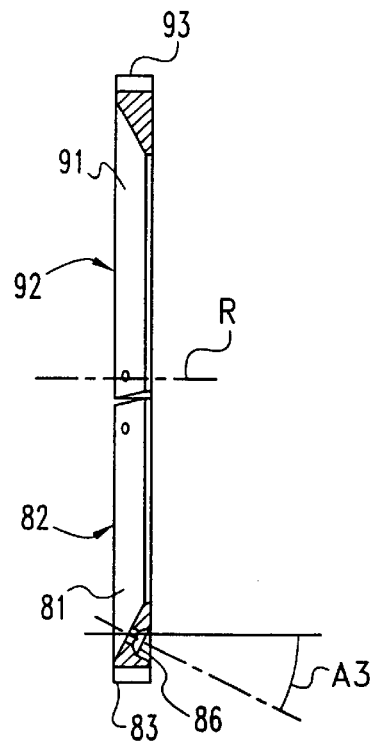
FIG. 6 is a cross sectional view of the tone wheel illustrated in FIGS. 1–5 which is separate from the crankshaft web to enhance clarity.

Referring to FIG. 6, beveled mounting surfaces 81, 91 corresponding to segments 82, 92 are illustrated. The bevel angle for these surfaces is preferably in a range of about 20°–25°, but may be varied as would occur to one skilled in the art. The angular orientation of a representative mounting hole 86 in segment 92 is illustrated as angle A3 relative to an axis that is parallel to rotational axis R. Preferably, angle A3 is about equal to the bevel angle.

For one preferred embodiment of wheel 80, separation angle A1 is no more than 25° and index angle A2 is at least 25% greater than angle A1 to provide an appropriate high precision resolution of crank angle and speed. For this embodiment, path S1 spans an angle of at least 180° about point P and path S2 spans an angle no more than 180° about point P, where these angles are equivalent to the angles swept by a radius rotating about point P from one end to the other of each segment 82, 92.

In the more preferred embodiment illustrated in FIGS. 1–6, angle A1 is about 10° and angle A2 is about 20° with about 27 generally equally sized teeth 83 defined by segment 82 and about 8 generally equally sized teeth 93 defined by segment 92. For this more preferred embodiment, S1 spans an angle of about 280° and S2 spans an angle of about 80° about point P.

In operation, sensor assembly 46 provides a magnetic field and hall effect device 45 generates an electrical signal in correspondence to alterations in that magnetic field. Teeth 83, 93 of wheel 80 are configured from a material designed to alter the magnetic field of hall effect device 45 as they rotate with crankshaft web 72a and crankshaft 60. As each tooth 83, 93 moves by detection end 47, a corresponding signal is generated by hall effect device 45 as a result of the alteration to the magnetic field. Preferably, the resulting signal is conditioned to provide a train of pulses with respect to time, where each pulse in the pattern represents a tooth as it passes by detection end 47 of sensor assembly 46.

The signal pattern provided by the generally uniform teeth 83, 93 and corresponding gaps 84, 94 is usually distinguishable from the signal pattern corresponding to index gap 85. As a result, index gap 85 provides a angular reference point for each revolution of crankshaft 60 which controller 40 may use to facilitate control of system 10. In one embodiment, index gap 85 may be positioned in a predetermined positional relationship to Top Dead Center (TDC) of a selected piston assembly 50 to control engine timing—accounting for the usual circumstance that a crankshaft makes two revolutions for each combustion/exhaust sequence of a given piston assembly in a four cycle engine. Furthermore, due to the uniformity of teeth 83, 93 and gaps 84, 94, controller 40 may readily register small changes in the speed of crankshaft 60 during each crankshaft rotation. In other embodiments, more or fewer teeth and different spatial patterns of teeth may be employed to accommodate the needs of the system employed.

Preferably, teeth 83, 84 of wheel 80 are manufactured from a ferrous material that readily registers an alteration of a magnetic field. Furthermore, as indicated in FIG. 1, it is preferred that tone wheel 80 and sensor assembly 46 be configured on a crankshaft web associated with the rearmost piston assembly 50 of engine 20. It has been discovered torsional of engine 20 induce less sensor noise when wheel 80 is mounted to this location as compared to locating tone wheel 80 on one of the more forward webs 70b–70f or 72b–72f. Nonetheless, it is envisioned that wheel 80 may be located in different locations along crankshaft 60 in other embodiments.

Besides a tooth/gap arrangement, other types of indicators or markers are envisioned as would be suitable for the particular type of sensor selected. For example, U.S. Pat. No. 4,155,430 to Fernquist et al. uses differently polarized magnets embedded in a reference member to serve as indicators. Also, besides hall effect devices, other types of sensors, including but not limited to inductive and magnetoresistive varieties, may be used in other embodiments. Similarly, in still other embodiments it may not be necessary to completely encircle crankshaft 60 with a ring structure in order to provide the desired precision. Also, it may not be necessary to include a reference gap or use a reference member with a ring shape. Furthermore, a single piece reference device; as opposed to the multi-piece tone wheel 80, may be mounted to a crankshaft web in alternative embodiments. In addition, it is envisioned that system 10 may be combined with other rotational sensor systems such as a camshaft detection system to provide the desired engine control.

In another embodiment of the present invention, a tone wheel 200 is attached to a gear driving the camshaft. Passage of tone wheel 200 past a Hall effect sensor located within a gear housing of engine 20 results in a sensor signal from which controller 40 can determine both the rotational speed of engine 20 and also the angular position of engine 20 within the thermodynamic cycle of the engine. This is because the camshaft rotates once for each repetition of the cycle in the case of a four stroke engine such as a diesel engine or a spark ignition engine. This differs from the embodiment of the present invention heretofore described in which tone wheel 80 is attached to crankshaft 60. In that embodiment, index gap 85 provides an angular reference point for each revolution of crankshaft 60, or two such angular references for each thermodynamic cycle. It may be desireable in that embodiment to have a second sensor to provide a single indication per thermodynamic cycle. In those embodiments of the present invention in which wheel 200 is rotating at the same speed as the camshaft, signals representing both engine speed and angular position can be provided by a single sensor. The expense and complication of a second sensor is thus eliminated.

Figure 7:
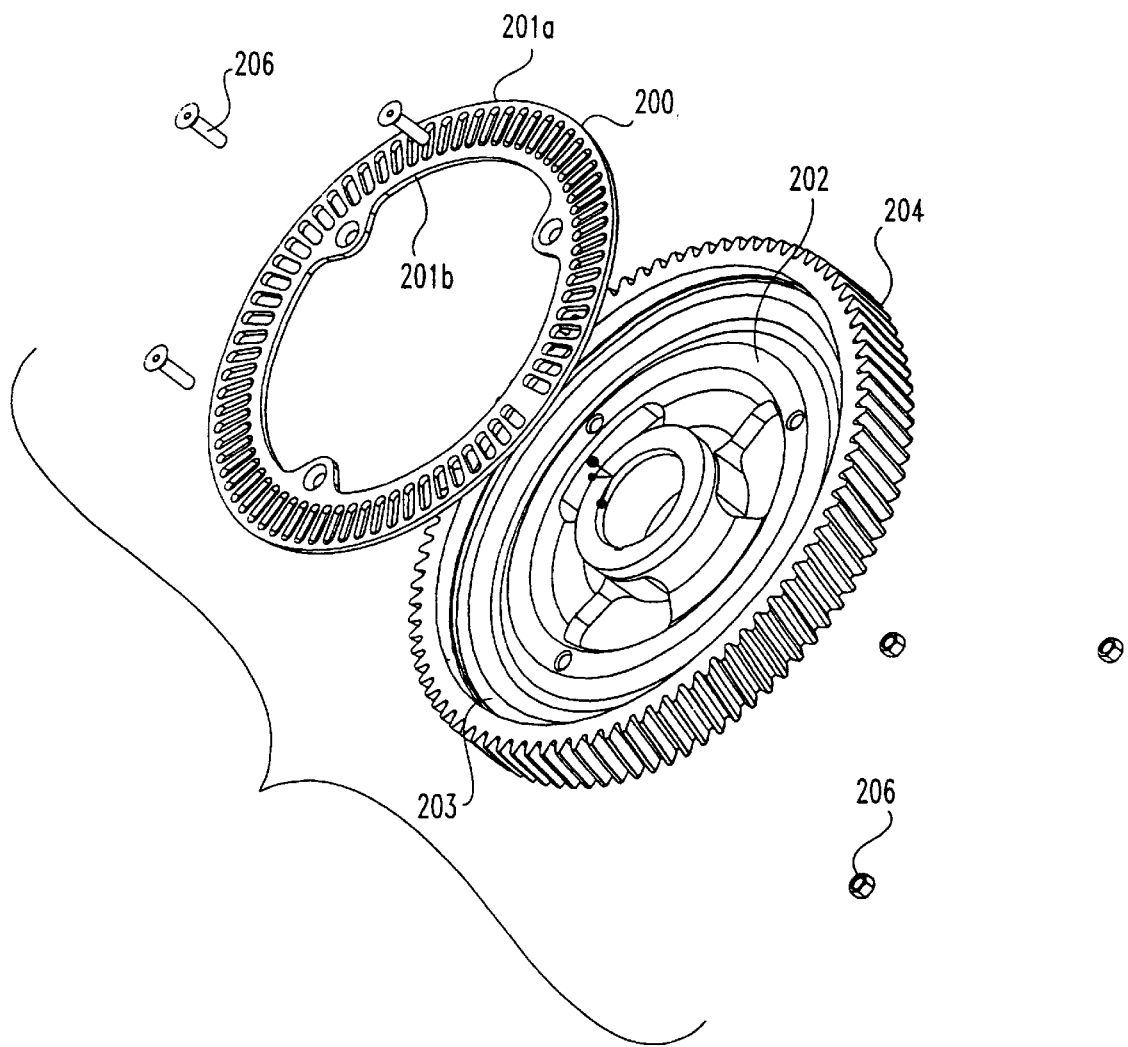
FIG. 7 is an exploded perspective view of a tone wheel and gear according to one embodiment of the present invention.
Figure 8:
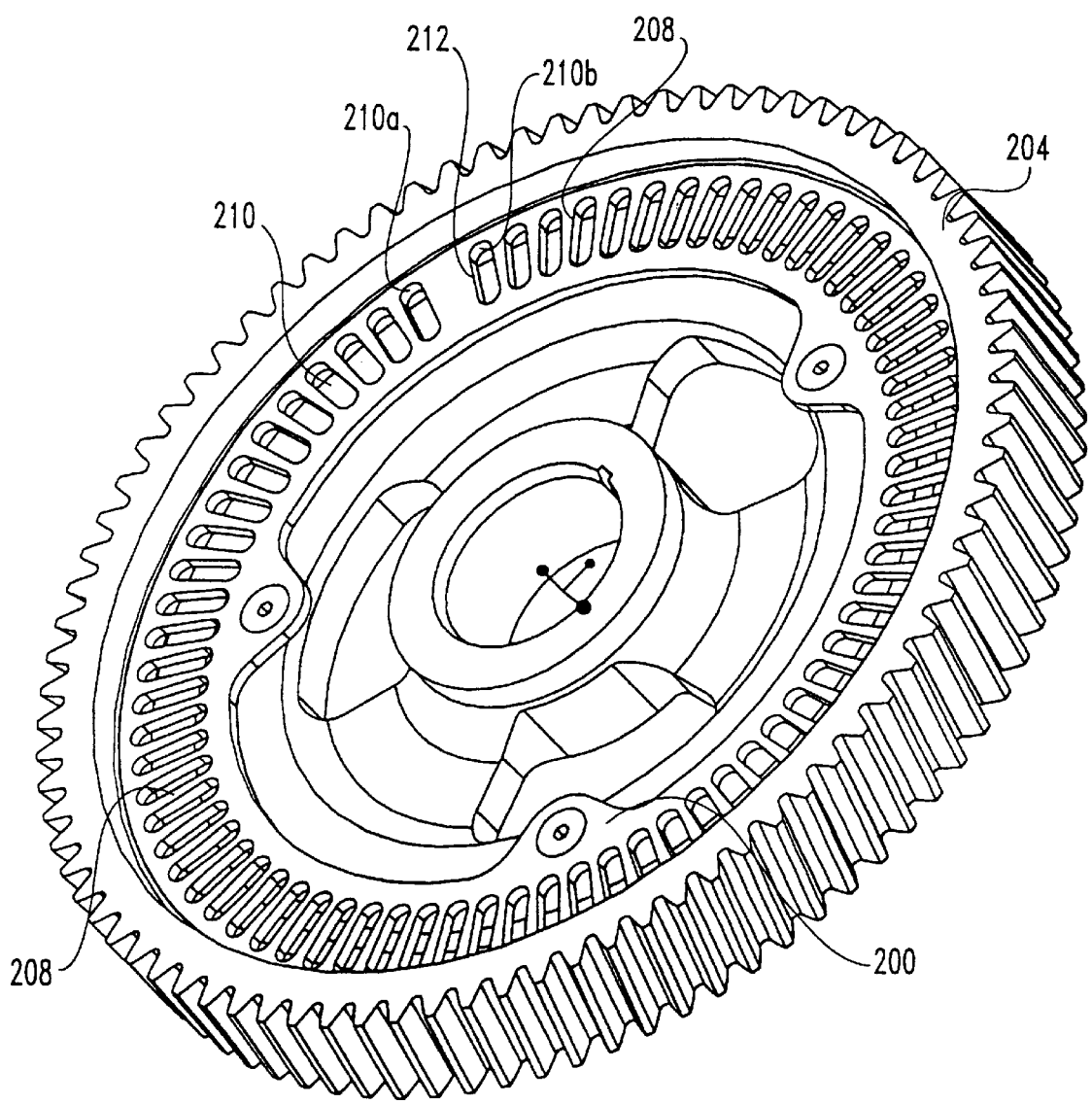
FIG. 8 is a perspective view of the tone wheel of FIG. 7 assembled onto the camshaft gear of FIG. 7.

FIG. 7 is an exploded perspective view of a tone wheel and gear according to another embodiment of the present invention. A tone wheel 200 attaches to gear face 202 of camshaft gear 204. Outer surface 201 of wheel 200 is a press fit within bore 203 of gear 204. In addition, wheel 200 is attached to gear 204 by fasteners 206. FIG. 8 shows wheel 200 assembled onto camshaft gear 204. Wheel 200 includes a plurality of reference indicators or webs 208. Between adjacent reference indicators 208 are a plurality of slots or windows 210.

Figure 9:
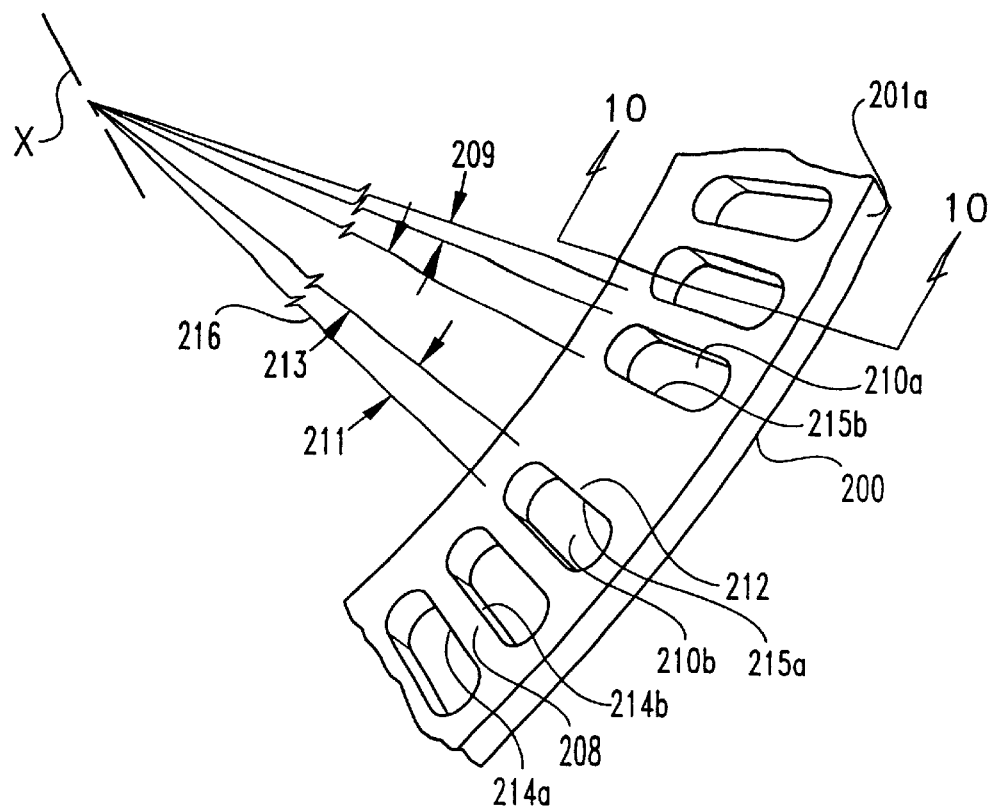
FIG. 9 is a perspective view of a portion of the tone wheel of FIG. 7.

FIG. 9 is a perspective view of a portion of wheel 200. Wheel 200 also includes a position indicator 212. Position indicator 212 is wider than reference indicators 208. In one embodiment of the present invention position indicator 212 results by not creating a slot 210 between slots 210a and 210b. Reference indicators 208 are of a first angular width 209. Position indicator 212 is of a second angular width 213 greater than width 209. Leading edge 214a and trailing edge 214b of each reference indicator 208 and the leading edge 215a and trailing edge 215b of position indicator 212 are radially aligned with centerline X of wheel 200. Slots 210 are thus pie-shaped and have an angular width 211. Each slot 210 is wider toward outer surface 201a of wheel 200 and narrower toward inner surface 201b. Radial lines 216 depict the radial nature of leading edges 214a and 215a and trailing edges 214b and 215b. In one embodiment of the present invention there are 71 slots 210 equally spaced from leading edge 215a of position indicator 212 to trailing edge 215b. In this embodiment the summation of angular width 211 and angular width 209 is about five degrees. Second angular width 213 is about seven degrees, and first angular width 209 is about two degrees. Although a specific number of slots and specific angular widths have been described for one embodiment of the present invention, those of ordinary skill in the art will recognize that there can be fewer or more slots, and reference and position indicators of greater or lesser width, provided that sensor 228 is capable of providing a sensor signal to controller 40 for the determination of engine speed and angular position with sufficient accuracy and resolution.

Figure 10:
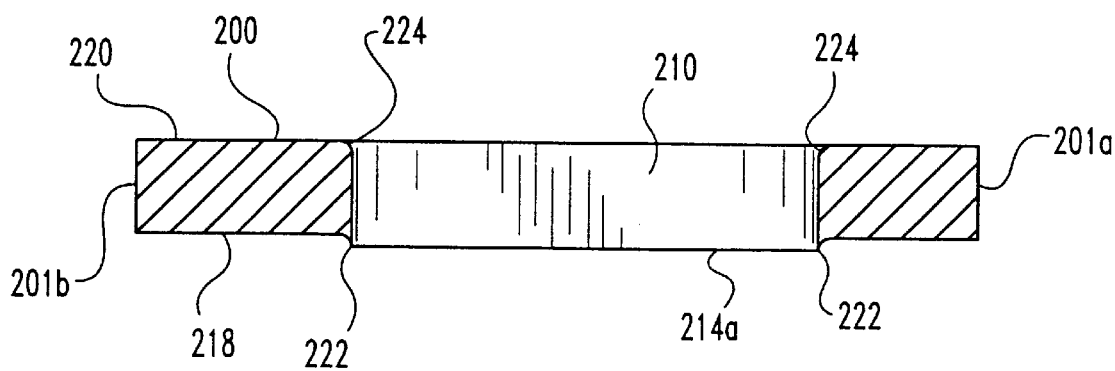
FIG. 10 is a cross-sectional view of the tone wheel of FIG. as taken along line 10—10 of FIG. 9.

FIG. 10 shows a cross-section of wheel 200 through a slot 210. Slot 210 is fabricated as a hole completely through wheel 200, extending from first face 218 through second face 220. Slots 210 are preferably formed in a fine blanking fabrication process, in which a first tool is located along first face 218 and overlaying the angular positions where reference indicators 208 and position indicator 212 are desired. A second tool overlays the position of indicators 208 and 212 along second face 220 of wheel 200. A third tool in the general shape of slot 210 is then pushed through wheel 200 from second face 220 to first face 218. This operation results in leading edges 214a and 215a and trailing edges 214b and 215b for indicators 208 and 212, respectively, to have a sharp edge 222 along first face 218 and a rounded edge 224 along second face 220. Although a particular fabrication process has been described for making wheel 200, those of ordinary skill in the art will recognize alternative methods for fabrication, including by way of example only stamping and casting. Wheel 200 is preferably fabricated from a material with high magnetic permeability such as low carbon steel so as to induce a magnetic effect in Hall effect sensor 228.

Figure 11:
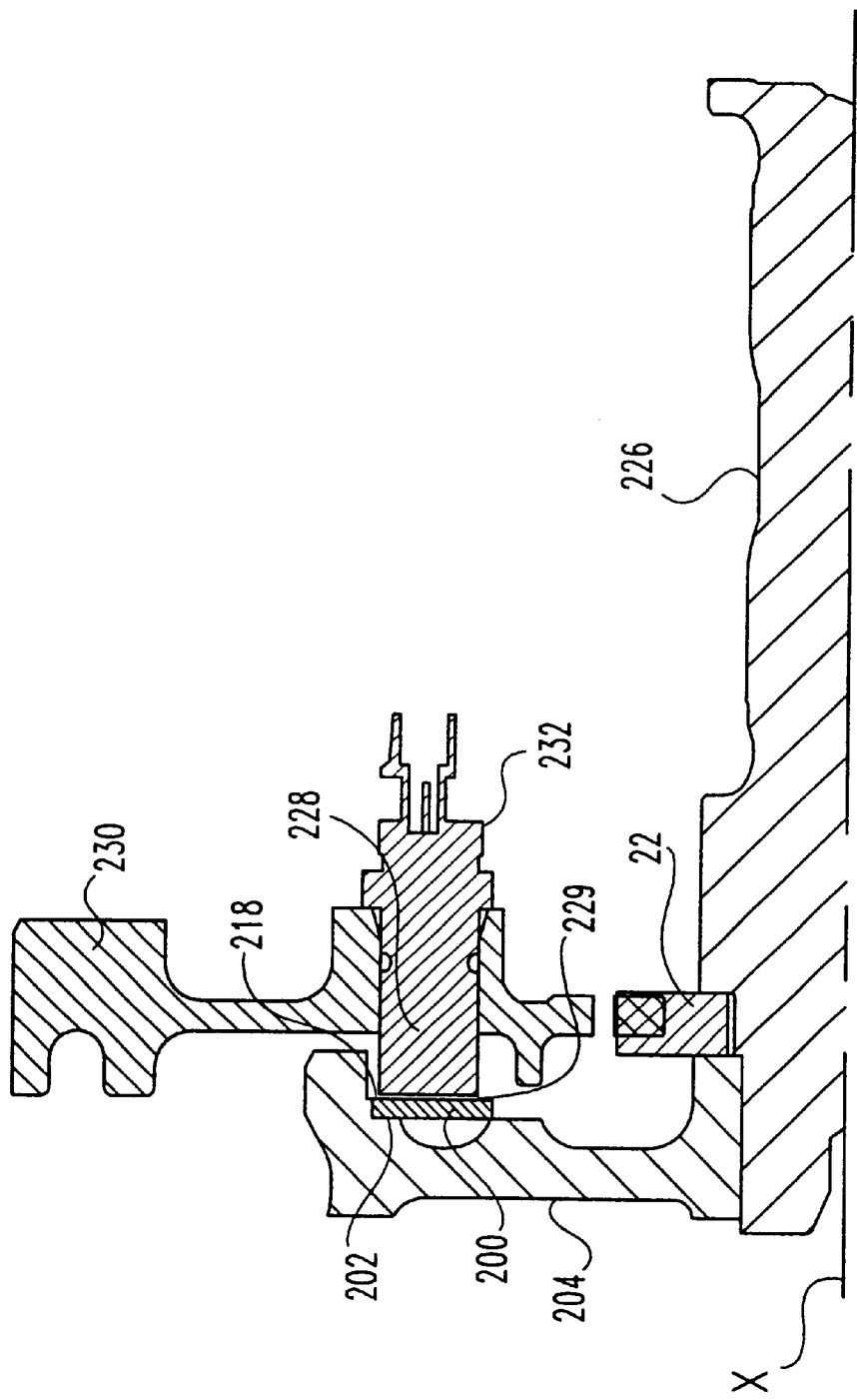
FIG. 11 is a cross-sectional view of a portion of an engine in corporating the tone wheel and camshaft gear of of FIG. 8.
Figure 12:
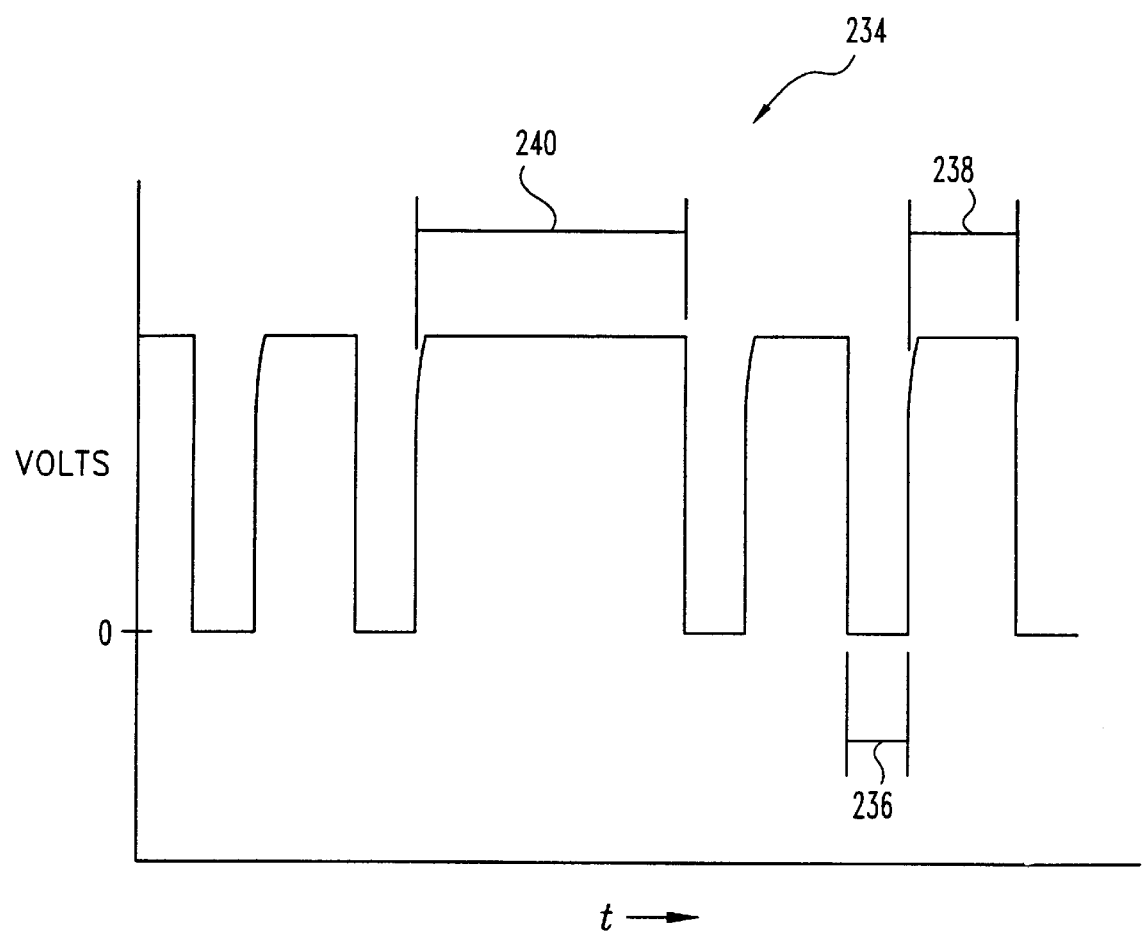
FIG. 12 is a graphical representation of a sensor signal according to one embodiment of the present invention.
Figure 13:
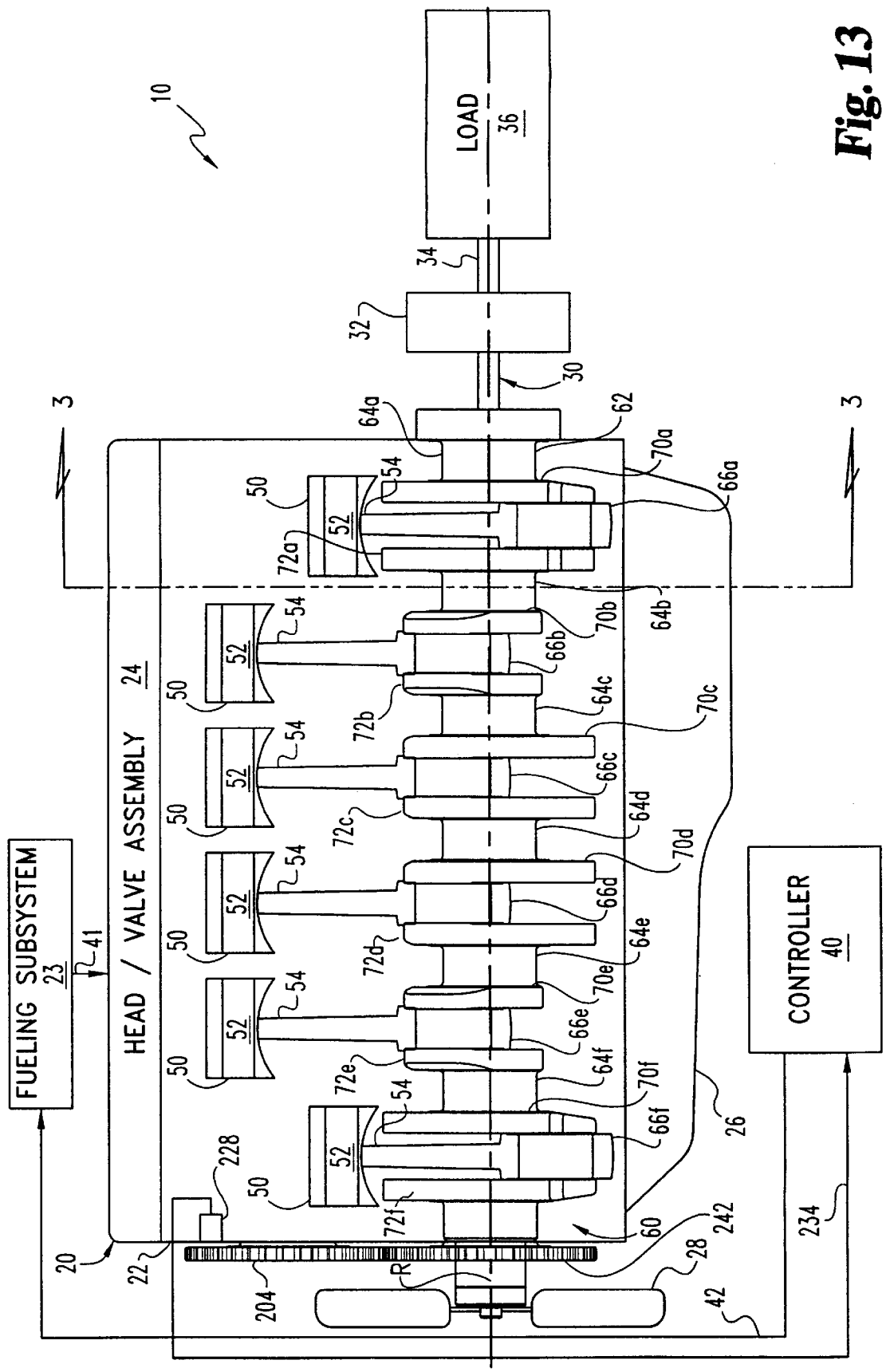
FIG. 13 is a partial diagramatic view of an internal combustion engine system according to one embodiment of the present invention.

FIG. 11 is a cross-sectional view of a portion of an engine showing one embodiment of the present invention. Camshaft gear 204 is attached to camshaft 226 which is configured to rotate about rotational axis X during operation of engine 20. Camshaft 226 is configured to operate poppet valves within head assembly 24. Wheel 200 is attached to camshaft gear 204 along gear face 202. A portion of camshaft gear 204 rotates past a portion of a gear housing 230 which supports and encloses a plurality of gears on the front face of engine 20 (not shown). A Hall effect sensor 228 is attached to and positioned within gear housing 230 such that first face 218 of wheel 200 preferably rotates past the face of sensor 228. FIG. 13 diagrammatically shows camshaft gear 204 being driven by one or more gears 242 which are driven by crankshaft 60. In some embodiments of the present invention a second Hall effect sensor 228 is attached to and positioned within gear housing 230 so as to provide a redundant sensor signal to controller 40.

Sensor 228 is located proximate to wheel 200 so as to detect reference indicators 208 and position indicator 212 as the indicators rotate past sensor 228. Sensor 228 is spaced apart from face 218 of wheel 200 by a gap 229 that ranges from about 0.020 inches to about 0.050 inches. Gear housing 230, camshaft gear 204, block 22, and camshaft 226 have mating and locating surfaces and dimensions that are included in the tolerance stack-up that determine the magnitude of gap 229. Because an accurate geometric relationship among these components is typically maintained in an internal combustion engine, it is not necessary in some embodiments of the present invention to provide a means for adjusting gap 229.

As wheel 200 rotates in accordance with rotation of camshaft 226, sensor 228 generates a sensor signal 234 that corresponds to rotation of wheel 200. Sensor signal 234 is provided to controller 40 which regulates various operations of engine 20. Sensor signal 234 is generally a series of repetitive square waves representing the passage of slots 210 and indicators 208 and 212 past sensor 228. The signal includes a single square wave that is longer in duration than the other waves, and corresponds to position indicator 212. It is desirable in some embodiments of the present invention that the wave form shown as signal 234 be sharp, with quickly rising leading and trailing edges of the electrical signal. The positioning of first face 218 with sharp edges 222 passing near sensor 228 has been found to improve the squareness of wave form 234, and thus improve the accuracy of speed and angular position measurements made by controller 40 from signal 234.

Sensor signal 234 is useful within controller 40 for measuring the rotational speed of engine 20 and also for measuring the angular position of engine 20. Repetitive portion 236 of sensor signal 234 is an electrical analog of angular width 209 of reference indicator 208. Repetitive portion 238 of sensor signal 234 is an electrical analog of angular width 211 of slot 210. Repetitive portion 240 of signal 234 is an electrical analog of angular width 213 of position indicator 212. Based upon knowledge of angular widths 209 and 211, controller 40 is able to apply time measurements to control signal 234 to determine the rotational speed of camshaft 226, which rotates at one-half of the speed of crankshaft 60.

Although a wheel with a pattern of alternating indicators and slots has been described, those of ordinary skill in the art will recognize that wheel 200 could also include a pattern of alternating indicators and depressions, such that the passage of the indicators and depressions past sensor 228 generates a sensor signal usable by controller 40. Also, those of ordinary skill in the art will also recognize that the reference and position indicators could be raised from a surface of wheel 200, thus forming valleys between the raised surfaces. Also, although the use of a Hall effect sensor has been shown and described, other types of sensors, including but not limited to inductive and magneto-resistive varieties, may be used in other embodiments. Furthermore, although wheel 200 has been shown and described as being attached to camshaft gear 204, other embodiments of the present invention include attachments of a tone wheel to camshaft 226.

Portion 240 of signal 234 provides an indication from which controller 40 determines the angular position of engine 20. Position indicator 212 is located accurately with respect to camshaft 226 by way of fasteners 206 which locate wheel 200 to camshaft gear 204, and by way of keyway 203 that accurately locates gear 204 to camshaft 226. Since camshaft 226 rotates once for each thermodynamic cycle of engine 20, or once for every two revolutions of crankshaft 60, position indicator 212 thus indicates the angular position of engine 20 within the thermodynamic cycle. Indicator 212 is aligned with a particular event within the thermodynamic cycle, such as by way of example only, the top dead center position of a piston assembly 50. Portion 240 of signal 234 may not necessarily align with leading edge 212a or trailing edge 212b of position indicator 212. This is because the change in voltage output of Hall effect sensor 228 may occur at some point other than the centerline of sensor 228. For this reason it is preferable to determine the electromagnetic offset from position indicator 212 to signal portion 240. This electromagnetic offset may be determined by methods known to those of ordinary skill in the art.

Because slots 210 and indicators 208 and 212 have an associated angular width, as compared to slots and indicators that have parallel edges, these embodiments of the present invention are relatively tolerant to mispositioning of sensor 228 relative to rotational axis X. Sensor 228 can be moved radially proximate to slots 210 and still provide a control signal 234 with accurate engine speed and angular position data. Conversely, a slot or indicator with parallel edges is not tolerant of radial mispositioning of the sensor. Parallel edged indicators and slots provide sensor signal portions with time durations dependent upon radial position of the sensor because the angular width of the indicators and slots seen by the sensor is a function of sensor radial position. In the present invention, the time durations of signal portions 236 and 238 represent fixed angular separations 209 and 211, respectively. The ratio of signal portion 236 to signal portion 238 does not depend upon radial position of the sensor.

By similar reasoning, the relationship of signal portion 240 to an angular position of engine 20 does not depend upon radial positioning of sensor 228. Thus indicator 212 results in a more accurate angular position measurement by controller 40, which is desireable for functions that should be carefully timed within the engine thermodynamic cycle, such as injection of fuel for optimum control of engine emissions.

All publications, patents, and patent applications cited in this specification are herein incorporated by reference as if each individual publication, patent, or patent application were specifically and individually indicated to be incorporated by reference and set forth herein.

While the invention has been illustrated and described in detail in the drawings and foregoing description, the same is to be considered as illustrative and not restrictive in character, it being understood that only a preferred embodiment has been shown and described and that all changes and modifications that come within the spirit of the invention are desired to be protected.

What is claimed is:

1. An apparatus comprising:
    an internal combustion engine with a camshaft gear, said camshaft gear being configured to rotate about a rotational axis during engine operation, said camshaft gear having a gearface;
    a wheel attached to the gearface of said camshaft gear, said wheel having a face in a plane perpendicular to the rotational axis, said wheel including a plurality of reference indicators located in said face, said reference indicators being of a first angular width, said wheel including a position indicator, said position indicator being of a second angular width greater than the first angular width; and
    a sensor mounted proximate to said engine wherein the face of said wheel rotates past said sensor.

2. The apparatus of claim 1 wherein said engine includes a gear housing, a portion of said camshaft gear rotates past a portion of said gear housing, and said sensor is mounted to said gear housing.

3. The apparatus of claim 1 wherein said reference indicators are separated by slots of a third angular width, the third angular width being different than the first angular width or the second angular width.

4. The apparatus of claim 1 wherein said engine includes a piston and a cylinder, and said position indicator is aligned with the top dead center position of said piston within said cylinder.

5. The apparatus of claim 1 wherein said wheel is separably mounted to said gearface by a fastener.

6. The apparatus of claim 1 wherein there are at least five said reference indicators evenly spaced from each other.

7. The apparatus of claim 1 wherein said wheel includes seventy equally spaced reference indicators and one position indicator.

8. The apparatus of claim 1 which further comprises a controller operatively coupled to said engine and responsive to said sensor to generate a control signal as a function of said sensor signal, said engine operating in accordance with said control signal, said internal combustion engine having a rotational speed and an angular position, and said controller using said reference indicators to determine the rotational speed of said engine, and said controller using said position indicator to determine the angular position of said engine.

9. The apparatus of claim 1 wherein said internal combustion engine includes a crankshaft and a camshaft driven by said camshaft gear, wherein said camshaft is in fixed angular relationship with said crankshaft.

10. The apparatus of claim 9 wherein said wheel has an outer diameter, and said reference indicators and said position indicator are located inward of the outer edge.

11. A system comprising:
    an internal combustion engine with a camshaft gear, said camshaft gear being configured to rotate about a rotational axis during said engine operation;
    a wheel attached to said camshaft gear, said wheel having a face, said wheel including a plurality of reference indicators located in said face, said reference indicators being of a first angular width, said wheel including a position indicator, said position indicator being of a second angular width different than the first angular width;
    a sensor located proximate to said wheel, said sensor detecting said plurality of reference indicators and said position indicator, said sensor providing a sensor signal corresponding to rotation of said wheel; and
    a controller operatively coupled to said engine and responsive to said sensor signal.

12. The system of claim 11 wherein the face of said wheel is in a plane perpendicular to the rotational axis.

13. The system of claim 11 wherein the second width is greater than the first width.

14. The system of claim 11 wherein said internal combustion engine having a rotational speed and an angular position, said controller using said reference indicators to determine the rotational speed of said engine, and said controller using said position indicator to determine the angular position of said engine.

15. The system of claim 11 wherein said engine includes a piston and a cylinder, and said sensor is mounted such that said position indicator indicates the top dead center position of said piston within said cylinder.

16. The system of claim 11 wherein said camshaft gear has a gearface, and said wheel is mounted to said gearface.

17. The system of claim 11 wherein said internal combustion engine includes a crankshaft and a camshaft driven by said camshaft gear, wherein said camshaft is in fixed angular relationship with said crankshaft.

18. The system of claim 17 wherein said wheel has an outer diameter, and said reference indicators and said position indicator are located inward of the outer edge.

19. An apparatus comprising:
  an internal combustion engine with a camshaft gear, said camshaft gear being configured to rotate about a rotational axis during engine operation;
  a wheel attached to said camshaft gear, said wheel having a face, said wheel including a plurality of reference indicators, said reference indicators being of a first angular width, said wheel including a position indicator, said position indicator being of a second angular width different than the first angular width; and
  a sensor mounted proximate to said engine;
  wherein said wheel is attached to said camshaft gear such that said face of said wheel rotates past said sensor and said sensor provides a signal responsive to said reference indicators and said position indicator.

20. The apparatus of claim 19 wherein said camshaft gear includes a gearface, and said wheel is mounted to said gearface.

21. The apparatus of claim 20 wherein said wheel is separably mounted to said gearface by a fastener.

22. The apparatus of claim 21 wherein said engine includes a gear housing, a portion of said camshaft gear rotates past a portion of said gear housing, and said sensor is mounted to said gear housing.

23. The apparatus of claim 19 which further comprises a controller operatively coupled to said engine and responsive to said sensor to generate a control signal as a function of said sensor signal, said engine operating in accordance with said control signal, said internal combustion engine having a rotational speed and a angular position, and said controller using said reference indicators to determine the rotational speed of said engine, and said controller using said position indicator to determine the angular position of said engine.

24. The apparatus of claim 23 wherein said engine includes a piston and a cylinder, and said sensor is mounted such that said position indicator indicates the top dead center position of said piston within said cylinder.

25. The apparatus of claim 19 wherein said internal combustion engine includes a crankshaft and a camshaft driven by said camshaft gear, wherein said camshaft is in fixed angular relationship with said crankshaft.

26. The apparatus of claim 25 wherein said wheel has an outer diameter, and said reference indicators and said position indicator are located inward of the outer edge.

* * * * *